US009264414B2

(12) United States Patent
Gargate

(10) Patent No.: US 9,264,414 B2
(45) Date of Patent: Feb. 16, 2016

(54) RETRY AND SNAPSHOT ENABLED CROSS-PLATFORM SYNCHRONIZED COMMUNICATION QUEUE

(71) Applicant: Microsoft Corporation, Redmond, WA (US)

(72) Inventor: Gaurav Gargate, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 301 days.

(21) Appl. No.: 13/871,868

(22) Filed: Apr. 26, 2013

(65) Prior Publication Data
US 2014/0282988 A1 Sep. 18, 2014

Related U.S. Application Data

(60) Provisional application No. 61/791,173, filed on Mar. 15, 2013.

(51) Int. Cl.
H04L 29/06 (2006.01)
H04L 29/08 (2006.01)
H04L 12/26 (2006.01)

(52) U.S. Cl.
CPC .............. *H04L 63/08* (2013.01); *H04L 63/126* (2013.01); *H04L 67/02* (2013.01); *H04L 43/0811* (2013.01); *H04L 63/0846* (2013.01)

(58) Field of Classification Search
None
See application file for complete search history.

(56) References Cited

U.S. PATENT DOCUMENTS

| 6,546,425 | B1 * | 4/2003 | Hanson et al. ................ 709/227 |
| 6,563,790 | B1 | 5/2003 | Yu et al. |
| 6,622,193 | B1 * | 9/2003 | Avery ........................... 710/263 |
| 6,683,850 | B1 * | 1/2004 | Dunning et al. .............. 370/231 |

(Continued)

FOREIGN PATENT DOCUMENTS

WO 2007/059169 A2 5/2007

OTHER PUBLICATIONS

Schultz, Keith, "Microsoft Active Directory Federation Services 2.0," Techworld.com, (downloaded from http://review.techworld.com/security/3229705/microsoft-active-directory-federation-services-20/ on Mar. 3, 2013), Jul. 7, 2010, (4 pages).

(Continued)

*Primary Examiner* — Andrew Nalven
*Assistant Examiner* — Christopher Ruprecht
(74) *Attorney, Agent, or Firm* — Thomas Marquis; Kate Drakos; Micky Minhas

(57) ABSTRACT

A queue in a connector service provides a unified communication channel and stores service packets sent to a target service from client applications. Incoming service request packets are modified at run time to add valid security tokens without requiring the user's action or notice. Before sending the packets, the connector service determines whether the authentication tokens are valid. Packets with valid authentication tokens are sent to the target service. If the communication request fails, the queue automatically adds the original communication packet to the end of the queue, so that it can be conditionally retried. When a loss of connectivity is detected, the connector service takes a snapshot of the queue by copying the packets to a storage module in the same order. When the connectivity is restored, the queue loads the saved requests from the storage module and starts processing them in the order they were received.

15 Claims, 5 Drawing Sheets

(56) References Cited

U.S. PATENT DOCUMENTS

| | | | |
|---|---|---|---|
| 8,132,242 B1* | 3/2012 | Wu | 726/8 |
| 8,190,960 B1* | 5/2012 | Bahadur et al. | 714/751 |
| 8,489,831 B2* | 7/2013 | Thompson et al. | 711/162 |
| 2003/0101213 A1 | 5/2003 | Wright | |
| 2006/0221925 A1* | 10/2006 | Beathard | 370/342 |
| 2007/0143481 A1* | 6/2007 | Roxburgh et al. | 709/227 |
| 2007/0266426 A1* | 11/2007 | Iyengar et al. | 726/5 |
| 2008/0165792 A1* | 7/2008 | Strader et al. | 370/412 |
| 2008/0225703 A1* | 9/2008 | Rider et al. | 370/229 |
| 2009/0178059 A1* | 7/2009 | Lang et al. | 719/318 |
| 2010/0306384 A1 | 12/2010 | Hayes | |
| 2011/0307947 A1 | 12/2011 | Kariv et al. | |
| 2012/0086978 A1 | 4/2012 | Uchikawa | |
| 2012/0109772 A1 | 5/2012 | Chernenko et al. | |

OTHER PUBLICATIONS

Sun, Aobing et al., "IaaS Public Cloud Computing Platform Scheduling Model and Optimization Analysis," International Journal of Communications, Network and System Sciences, Dec. 2011, pp. 803-811.

Preventia Ltd, "Centrally Controlling, Securing and Auditing Access to Cross-Platform Systems and Applications Using the Centrify Suite," Centrify White Paper, Oct. 2011, (38 pages).

Steven, John et al., "Don't Trust. And Verify: A Security Architecture Stack for the Cloud," Proceedings of IEEE Security & Privacy, vol. 8, Issue 5, Sep./Oct. 2010, pp. 83-86.

"International Search Report & Written Opinion for PCT Patent Application No. PCT/US2014/026922", Mailed Date: Jul. 30, 2014, Filed Date: Mar. 14, 2014, 11 Pages.

* cited by examiner

RETRY AND SNAPSHOT ENABLED CROSS-PLATFORM SYNCHRONIZED COMMUNICATION QUEUE

CROSS-REFERENCE TO RELATED APPLICATIONS

This application claims the benefit of the filing date of U.S. Provisional Patent Application No. 61/791,173 which is titled "Retry and Snapshot Enabled Cross-Platform Synchronized Communication Queue" and was filed on Mar. 15, 2013, the disclosure of which is hereby incorporated by reference herein in its entirety.

BACKGROUND

Many businesses provide target services, such as enterprise resource planning (ERP) and customer relationship management (CRM) applications, to support employee requirements, such as tracking expenses, tracking time entries, and maintaining contact and account information. These applications often use and store confidential and proprietary company information, such as financial data, contact information, and personnel files. Businesses need to limit access to these applications and their associated information to authorized users to prevent fraudulent use and privacy violations.

When users are on-site using an enterprise computer network to access the services, a business may authenticate users who access the enterprise network by requiring sign-on credentials or other identifying information. However, when users are off-premises, it becomes more difficult to authenticate users and to provide services in a secure manner. To maintain security, users who access services via a mobile client, such as a smartphone or tablet, must be authenticated as authorized before being allowed to perform actions exposed by the services.

Client applications used to access business services need a reliable and synchronized communication link that allows users to interact with the services from a remote location. The communication link should also work across different client applications and devices. For example, users may send authenticated requests and service calls to a cloud-based ERP system and then receive business entities and ERP objects in response. In current systems, if a communication link fails, each individual client application must identify the failure, determine which packets did not reach the target system, and then resend those packets. For a temporary failure, the resent packets may go through to the service on a first retry. However, if the destination service is offline, then the client application must store the packets and continue to retry sending the packets until the service is online. This can be a problem if the packets are sent with authentication tokens that may expire or otherwise need to be generated for the retry packets.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the invention provide a retry mechanism for packet sent from a client application to a target service, such as a cloud-based enterprise resource planning application or other business service. The retry mechanism recognizes failed requests and retries sending those failed requests to the target without notifying the client application. In the event that the target server is offline, the retry mechanism saves a snapshot of the communication operations to capture a pending queue of packets.

When a loss of connectivity occurs, this retry and snapshot mechanism saves business operations, such as web service calls, in the current queue and restarts the calls in the same order once connectivity is restored. This ensures that the packets can be authenticated when sent on a restored connection.

Incoming service request packets may be modified at run time to have valid security tokens, such as an Active Directory Foundation Service token and/or Access Control System token, before being pushed into the queue. The tokens provide the service request packet with authentication rights that are needed to communicate with a target service. Additionally, the security tokens are used to prevent unauthenticated calls from communicating with the target service.

The service request packets in the queue are processed in the order received. When a packet is ready to be sent to the target service, a connector service may first perform a check to confirm that the authentication tokens for that packet are still valid. Once the service request packet is sent to target service, the packet is removed from queue.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
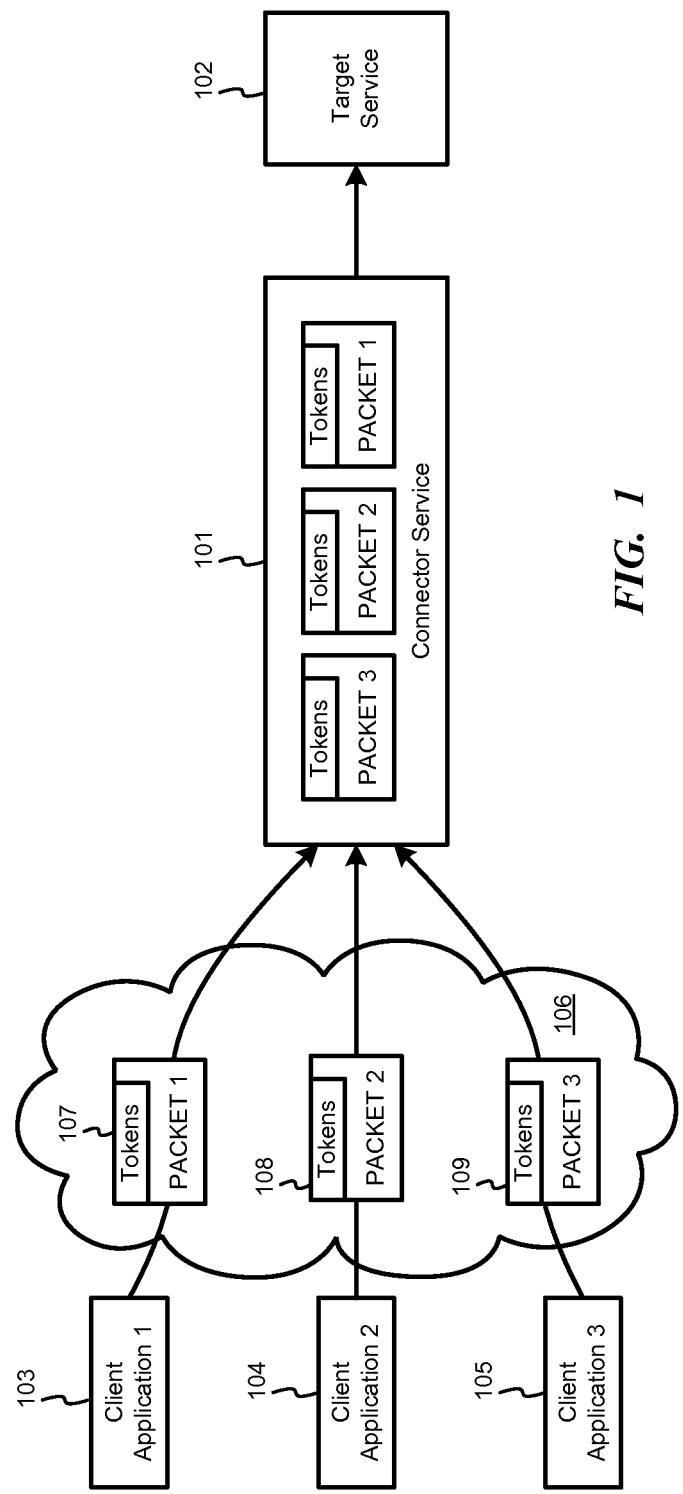
FIG. 1 is a block diagram illustrating a system for providing a retry and snapshot mechanism according to one embodiment.

FIG. 1 is a block diagram illustrating a system for providing a retry and snapshot mechanism according to one embodiment. A connector service 101 acts as a front end or interface between a target service 102 and client applications 103-105. Client applications 103-105 may be associated with any fixed or mobile device, such as a computer, laptop, tablet, smartphone, browser, or the like. For example, the client application may be a Microsoft.NET software application, a service, a website, or any fixed or mobile point inside or outside an enterprise network that can make a service request to target service 102. Client applications 103-105 make web service calls to target service 102 over HTTP through network 106, which may be the Internet or any public or private data network, such as a cloud computing service.

It will be understood that the target service 102 may include any enterprise resource planning, customer relationship management, or other enterprise, back office, or back end service, including, for example, but not limited to, accounting, planning, scheduling, personnel, time capture, expense capture, project management, resource management, or approvals application, or other back-end system that exposes web services. In another embodiment, target service 102 may be a collection of different systems having any such services.

Client applications 103-105 send service calls in packets 107-109 on network 106 to connector service 101, which exposes one or more end points associated with target service 101. Depending upon the configuration of the client application 103-105, packets 107-109 may be associated with different protocols. For example, the client applications 103-105 may use Simple Object Access Protocol (SOAP) web services or Representational State Transfer (REST) web services to communicate with target service 102.

The communications between the client applications 103-105 and target service 102 may need to be authenticated for security reasons. Accordingly, the client applications may use identity providers and security token services approved by the target service to generate authentication tokens. For example, in one embodiment, the tokens may be obtained from an Active Directory Federation Service and an Access Control System.

Figure 2:
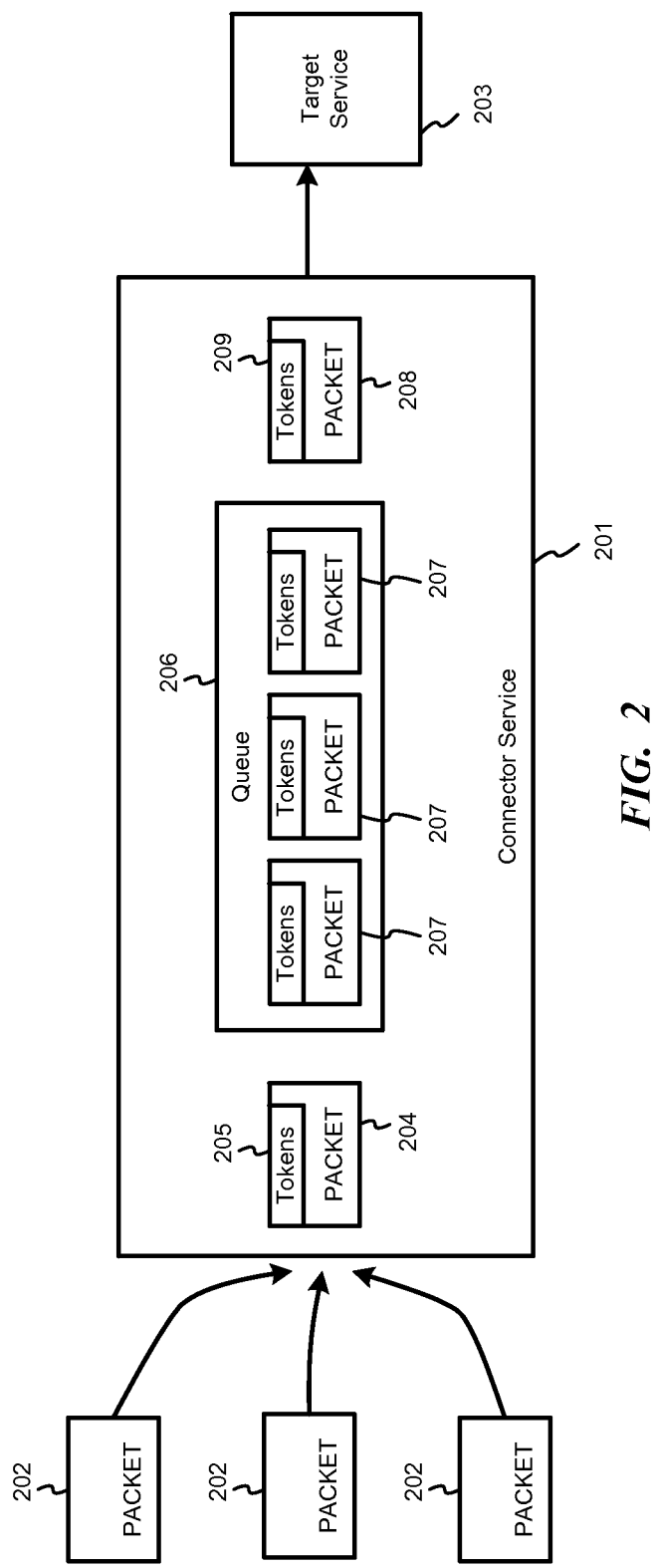
FIG. 2 is a block diagram illustrating details of a connector service according to one embodiment.

FIG. 2 is a block diagram illustrating details of a connector service 201 according to one embodiment. Connector service 201 collects packets 202 from one or more client applications, such as client applications 103-105 (FIG. 1). Packets 202 are directed to target service 203. Connector service 201 may be co-located with target service 203, such as running on the same server or cluster. In other embodiments, connector service 201 and target service 203 may be running on separate servers or clusters and may be located in different places.

When a new packet 204 is received, connector service 201 adds authentication tokens 205 to the packet 204. The new packet 204 is added to queue 206 that holds a number of previously received packets 207. The packets in queue 206 are maintained in the order they are received at connector service 201 and are handled in a first-come, first served manner. Queue 206 allows connector service 201 to synchronize operations with target service 203 and thereby avoid adverse communication scenarios, such as race conditions.

Queue 206 may be implemented in JavaScript in one embodiment. All HTTP communication to target service 203 is first directed to connector service 201 and is held in queue 206. This arrangement provides a unified communication channel for all web service requests and responses between the client application and the target service 203. Using queue 206, connector service 201 can easily manage, update, and authenticate all incoming communication service requests.

In one embodiment, incoming service request packet 204 may be modified at run time to have valid tokens 205, such as an Active Directory Foundation Service token and Access Control System token, before being pushed into the queue 206. Tokens 205 provide service request packet 204 with authentication rights that are needed to communicate with target service 203. The service request packets 207 in queue 206 are processed in the order received. When a packet 208 is ready to be sent to target service 203, connector service 201 first performs a check to confirm that authentication tokens 209 for that packet are still valid. Once the service request packet 208 is sent to target service 203, the packet is removed from queue 206.

Figure 3:
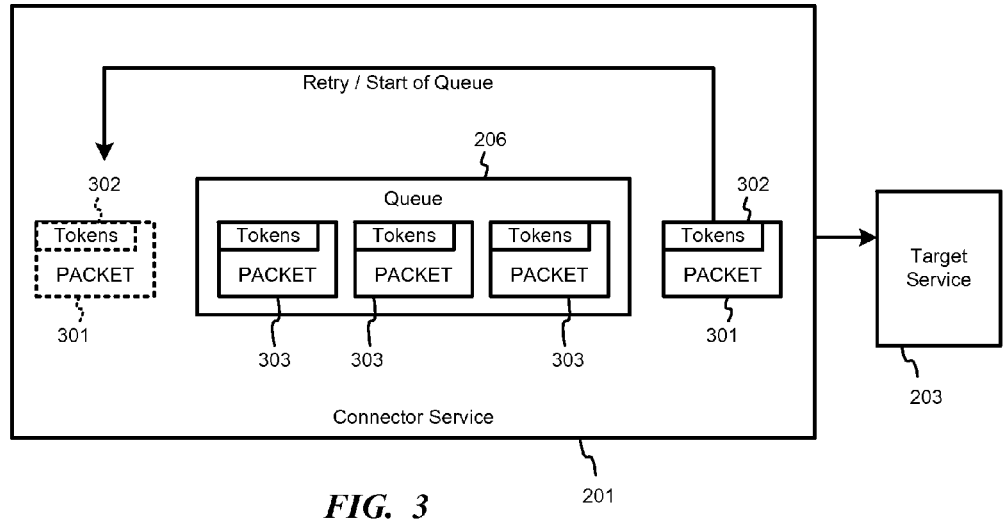
FIG. 3 is a block diagram illustrating how a service request packet is handled by connector service when communications with the target system fails.

FIG. 3 is a block diagram illustrating how a service request packet 301 is handled by connector service 201 when communications with the target system 203 fails. Connector service 201 detects the failure of packet 301 to reach target system 203. In this situation, connector service 201 automatically adds packet 301 to the start of queue 206 behind any other packets 303 that are currently in the queue. This allows the connector service 201 to make another attempt to send the packet 301 at a later time after the other packets 303 have been transmitted to target service 203.

By using queue 206, any failed communication packets 301 or any false or un-intended communication request failure will be retried so that each packet has a high probability of reaching target service 203. Accordingly, after the other packets 303 are sent to target service 203, connector service 201 will again verify that tokens 302 are valid and will resend packet 301.

If connector service 201 determines that tokens 302 are invalid when the time comes to resend packet 301, then the packet 301 will be discarded.

Figure 4:
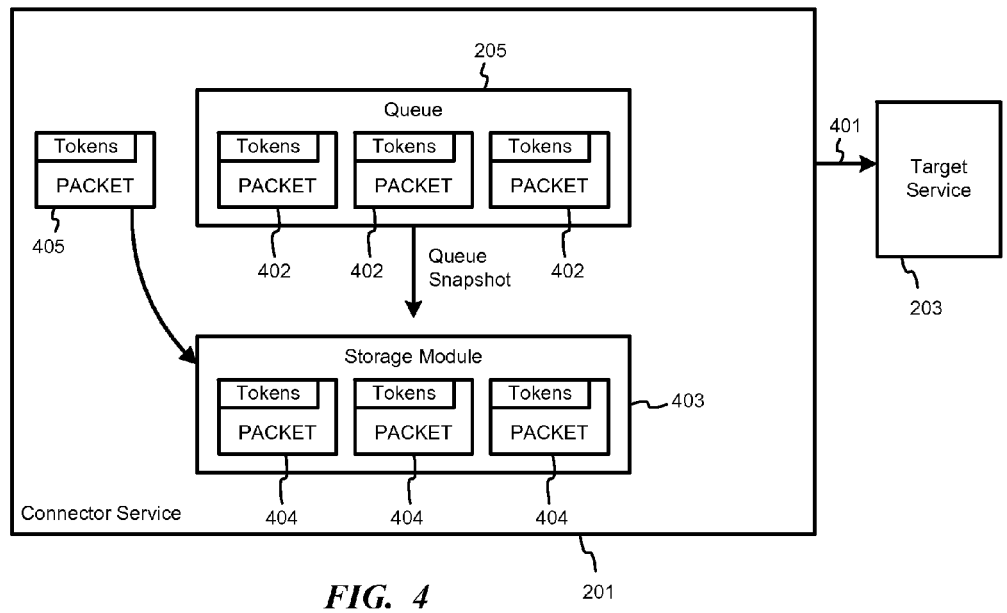
FIG. 4 is a block diagram illustrating how connector service handles communication interruptions.

FIG. 4 is a block diagram illustrating how connector service 201 handles communication interruptions. Connector service 201 detects when a communication link 401 to target service 203 has failed or when the target service is offline. When connector service 201 detects a loss of connectivity, there may still be packets 402 pending in queue 205. Each communication packet 402 is an authenticated service operation that is waiting to be transmitted to target service 203.

At any given time, queue 205 will contain unsent service requests 402. When it detects the loss of connectivity to the target service 203, connector service 201 immediately snapshots queue 205 by copying the pending packets 402 to a storage module 403 in their current order.

In addition to the stored snapshot packets 404, which have been saved in storage module 403 in their original order of arrival, any new incoming service requests 405 and their associated tokens also get automatically saved to the storage module 402.

Eventually connectivity to target service 203 will be restored, such as when a host server comes back online or when a communication link is reestablished. At that time, queue 206 will load all the saved requests 404 from storage module 402, and connector service 201 will start processing the packets in the order they were originally received. Prior to sending any packets to target service 203, connector service 201 will confirm if the tokens for service requests 402 are still valid and unexpired. Any packets with valid tokens are sent to target service 203. In some cases, packets 404 may have authentication tokens that were valid when the snapshot was taken but that expired while waiting for connectivity to be restored. Those packets with expired or invalid tokens will be discarded before being sent to target service 203.

Connector 201 supports making authenticated service calls over HTTP to any entity service, such as target service 203 or other business entity. Connector service 201 works across all client platforms. Additionally, connector service 201 is agnostic to the type of device and/or browser used by a client. Connector service 201 may expose endpoints for the service calls to the target service. Any client application may send packets with the appropriate tokens to the exposed endpoints, and connector service 201 does not care where the service calls originate. Queue 205 allows the connector service 201 to keep the calls stateless, but maintains enough information on each service call to be able authenticate the call and to talk to the target service.

Figure 5:
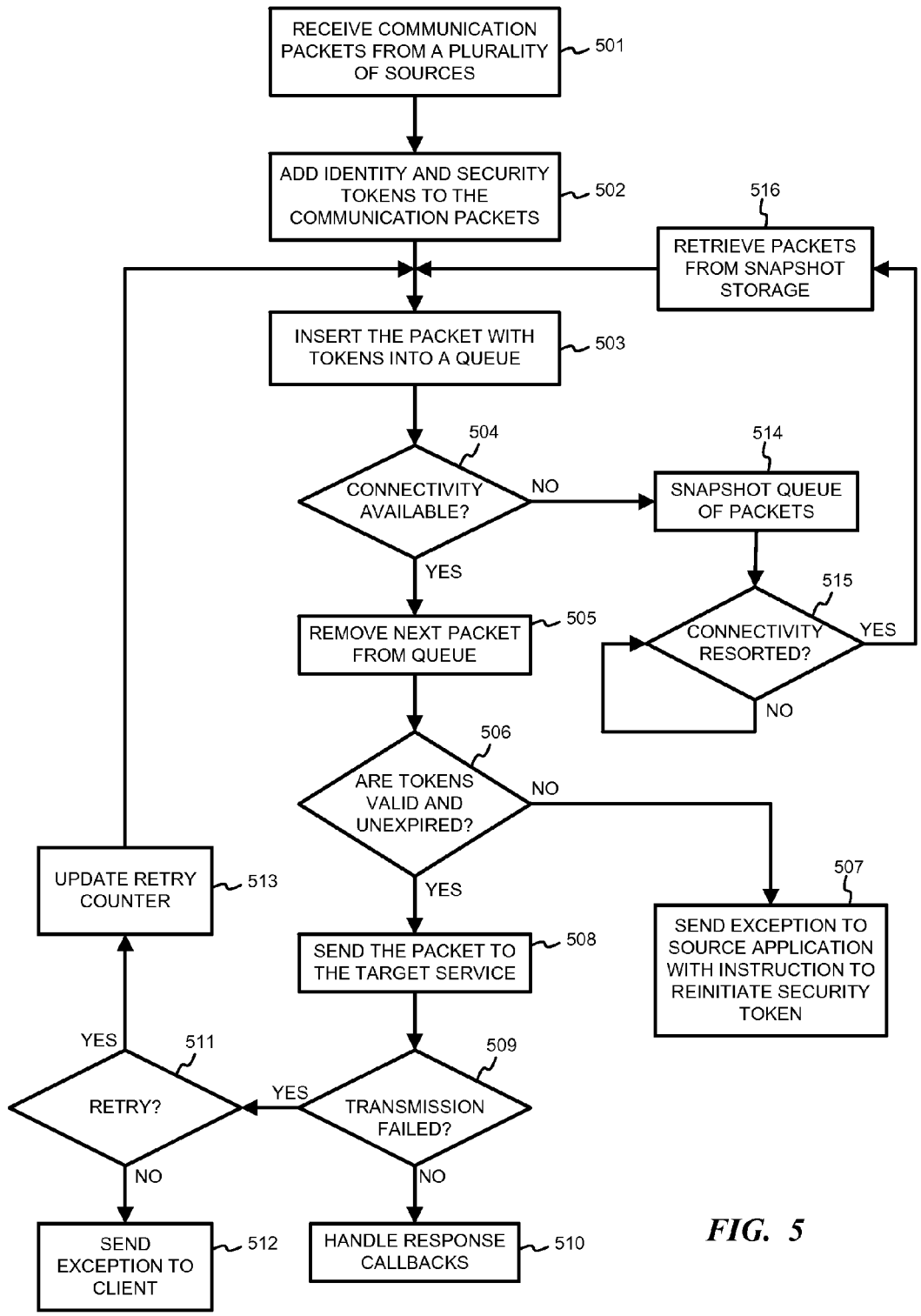
FIG. 5 is a flowchart illustrating a method or process for providing a retry and snapshot mechanism.

FIG. 5 is a flowchart illustrating a method or process for providing a retry and snapshot mechanism. In step 501, communication packets are received from a plurality of sources, such as client applications. Any client application using any protocol, such as SOAP or REST, may generate packets and send them to the connector service. In step 502, identity and/or security tokens are added to the packets. The tokens may be obtained from a header or a body of a message carrying the communication packets. In step 503, the packets and their associated tokens are added to a communication queue. The queue operates on a first-come, first-served basis.

In step 504, the connector service evaluates if connectivity is available to a target service. Connectivity may be inferred by the connector service based upon network activity. In other embodiments, if the target service is unavailable or not receiving service calls, it may explicitly notify the connector service of connection status. If connectivity is available in step 504, then the next packet is removed from the queue.

The tokens for that packet are inspected in step 506 and evaluated for validity and currency. If the tokens are not valid and/or are expired, then the process moves to step 507 and an exception is sent to the source application with an instruction to reinitiate the security token for that packet. The client application may resend the packet to the connector service after obtaining updated tokens. The connector service will process the resent packet with updated tokens in the same manner as any other newly received packet.

If the tokens for the packet are valid and unexpired in step 506, then the packet is sent to the target service in step 508. The connector service monitors the packet in step 509 and evaluates if the transmission to the target service failed. If the transmission has not failed—i.e., if the packet was successfully sent to the target service in step 509—then the connector service handles response callbacks from the target service in step 510.

If the transmission has failed—i.e., if the packet was not successfully sent to the target service in step 509—then the connector service evaluates whether to retry sending the packet in step 511. If the packet will not be retried, then, in step 512, the connector service sends an exception to the client application. The exception may notify the client application that the packet was not successfully sent to the target service. The exception may include more detailed information with reasons for the failure, such as any exception from the target service.

If the packet is going to be retried in step 511, then the connector service updates a retry counter in step 513. The retry counter may be used, for example, in retry evaluation step 511 to determine whether to allow any further retry attempts. The retry counter may be used to limit the number of retries to a predetermined number of attempts. In other embodiments, the number of retries may be limited to a certain number of attempts within a designated period.

After updating the retry counter in step 511, the process moves to step 503 and the packet is inserted back into the start of the queue. The process continues with the next packet in the queue.

As noted above, the connector service evaluates if connectivity is available to a target service in step 504. If connectivity is not available, then the connector service takes a snapshot of the current queue in step 514. The connector service copies all of the packets in the queue, along with any associated tokens and other information, to a local storage. The stored packets may also be removed from the queue.

In step 515, the connector service monitors connectivity and evaluates whether connectivity has been restored. As long as connectivity is still down, the process will loop at step 515 and periodically update connection status. During step 515, any new received packets at the connector service are added to the local storage along with the other packets instead of being added to the queue.

The connector service will detect when connectivity has been restored either by observed network activity or after receiving a notification from the target service that is available. When the connectivity status has been updated in step 515, the process moves to step 516 where the packets are retrieved from the local storage. Then, returning to step 503, the packets are returned to the queue in the same order as they were received. The process then continues with the next packet in the queue.

It will be understood that steps 501-516 of the process illustrated in FIG. 5 may be executed simultaneously and/or sequentially. It will be further understood that each step may be performed in any order and may be performed once or repetitiously.

Generally, steps 501-506 and 508-510 represent typical packet flow through the connector service when connectivity is maintained and retries are not required. Step 507 is performed when a packet's tokens are invalid or expired.

When a packet transmission fails between the connector service and the target service, then steps 511-513 are performed while the connector service attempts to retry sending the packet. The retry process is further illustrated and described in reference to FIG. 3 above.

When connectivity has failed between the connector service and the target service, then steps 514-516 are performed while the connector service stores and protects the pending packets using the snapshot process. The snapshot process is further illustrated and described in reference to FIG. 4 above.

Figure 6:
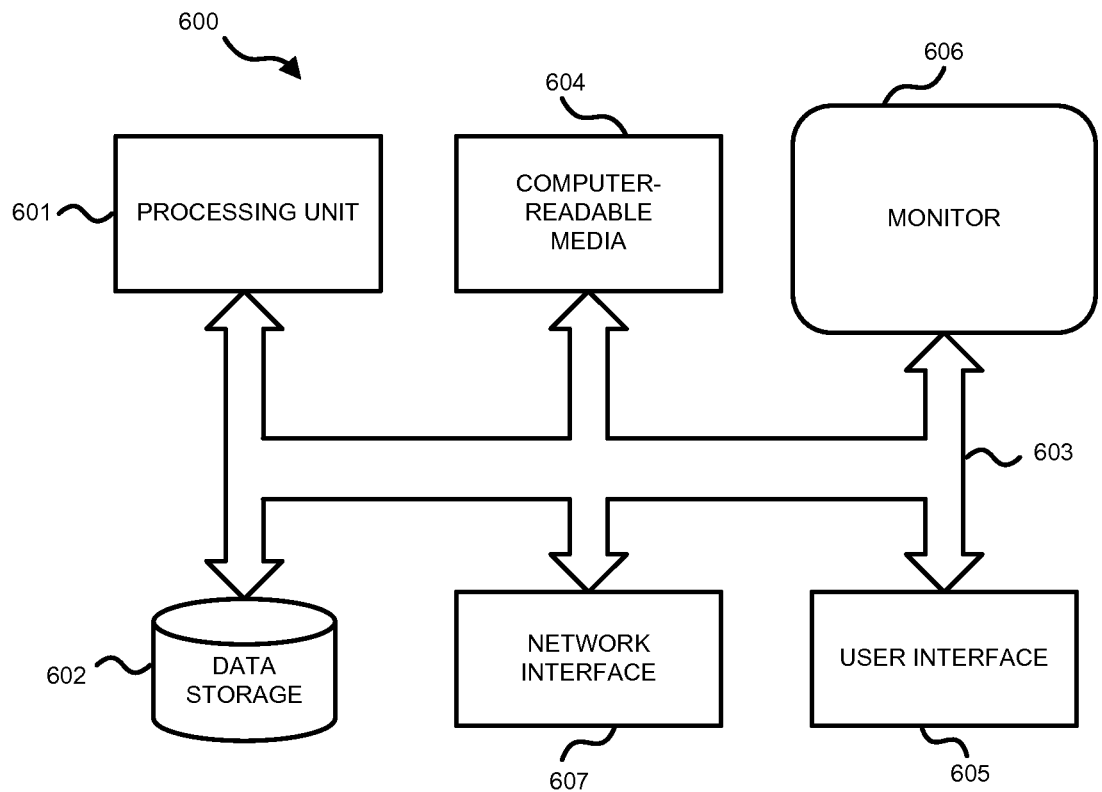
FIG. 6 illustrates an example of a suitable computing and networking environment for managing communication packets.

FIG. 6 illustrates an example of a suitable computing and networking environment 600 on which the examples of FIGS. 1-5 may be implemented. Computing environment 600 may be used to host a client application that provides communication packets, a connector service, or a target service. The computing system environment 600 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 600. Components may include, but are not limited to, various hardware components, such as processing unit 601, data storage 602, such as a system memory, and system bus 603 that couples various system components including the data storage 602 to the processing unit 601. The system bus 603 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Processing unit 601 may support a communication queue in a connector service. Data storage 602 may be used to store communication packets, such as a snapshot copy of communication packets from a queue.

The computer 600 typically includes a variety of computer-readable media 604. Computer-readable media 604 may be any available media that can be accessed by the computer 600 and includes both volatile and nonvolatile media, and removable and non-removable media, but excludes propagated signals. By way of example, and not limitation, computer-readable media 604 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 600. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 602 includes computer storage media in the form of volatile and/or nonvolatile memory such as read only memory (ROM) and random access memory (RAM). A basic input/output system (BIOS), containing the basic routines that help to transfer information between elements within computer 600, such as during start-up, is typically stored in ROM. RAM typically contains data and/or program modules that are immediately accessible to and/or presently being operated on by processing unit 601. By way of example, and not limitation, data storage 602 holds an operating system, application programs, and other program modules and program data.

Data storage 602 may also include other removable/non-removable, volatile/nonvolatile computer storage media. By way of example only, data storage 602 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 6, provide storage of computer-readable instructions, data structures, program modules and other data for the computer 600.

A user may enter commands and information through a user interface 605 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 601 through a user input interface 605 that is coupled to the system bus 603, but may be connected by other interface and bus structures, such as a parallel port, game port or a universal serial bus (USB). A monitor 606 or other type of display device is also connected to the system bus 603 via an interface, such as a video interface. The monitor 606 may also be integrated with a touchscreen panel or the like. Note that the monitor and/or touch screen panel can be physically coupled to a housing in which the computing device 600 is incorporated, such as in a tablet-type personal computer. In addition, computers such as the computing device 600 may also include other peripheral output devices such as speakers and printer, which may be connected through an output peripheral interface or the like.

The computer 600 may operate in a networked or cloud-computing environment using logical connections 607 to one or more remote devices, such as a remote computer. The remote computer may be a personal computer, a server, a router, a network PC, a peer device or other common network node, and typically includes many or all of the elements described above relative to the computer 600. The logical connections depicted in FIG. 6 include one or more local area networks (LAN) and one or more wide area networks (WAN), but may also include other networks. Such networking environments are commonplace in offices, enterprise-wide computer networks, intranets and the Internet.

In one embodiment, network interface 607 is used to exchange communication packets to and from a connector service. The network interface may support communication packets in various protocols, such as REST and SOAP.

When used in a networked or cloud-computing environment, the computer 600 may be connected to a public or private network through a network interface or adapter 607. In some embodiments, a modem or other means for establishing communications over the network. The modem, which may be internal or external, may be connected to the system bus 603 via the network interface 607 or other appropriate mechanism. A wireless networking component such as comprising an interface and antenna may be coupled through a suitable device such as an access point or peer computer to a network. In a networked environment, program modules depicted relative to the computer 600, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for providing a communication interface for a target service, comprising:
   receiving communication packets from a plurality of client applications, the communication packets all directed to the target service;
   adding authentication tokens to the communication packets;
   inserting the communication packets with authentication tokens into a queue;
   sequentially analyzing the validity of the authentication tokens on each communication packet in the queue;
   sending at least a subset of the communication packets with valid and unexpired authentication tokens to the target service;
   determining when a connection is lost to the target service;
   in response to the determination, taking a snapshot of the queue by copying pending communication packets and associated authentication tokens from the queue to a local storage in the order the packets were received;
   removing the copied communication packets and associated authentication tokens from the queue;
   determining that the connection is re-established with the target service;
   re-loading the copied communication packets and associated authentication tokens from the snapshot to the queue;
   verifying a validity of a given authentication token associated with at least one of the re-loaded communication packets in the queue; and
   in response to determining that the given authentication token is valid, sending the at least one of the re-loaded communication packets from the queue to the target service.

2. The method of claim 1, further comprising:
   managing security and identity tokens to allow authenticated communication for a plurality of client platforms and to prevent unauthenticated communications to the target service.

3. The method of claim 1, further comprising:
   receiving a new communication packet while the network connection is lost; and
   adding the new communication packet to the local storage in order with the other communication packets.

4. The method of claim 1, further comprising:
   identifying when a communication packet transmission to the target service fails; and
   adding the failed communication packet to a start of the queue.

5. The method of claim 4, further comprising:
   updating a retry counter when the failed communication packet is added to the queue.

6. The method of claim 1, further comprising:
   identifying when a communication packet transmission to the target service fails;
   reading a retry counter value; and
   adding the failed communication packet to a start of the queue when the counter value is less than a predetermined value.

7. The method of claim 1, further comprising:
   identifying when a communication packet transmission to the target service fails;
   reading a retry counter value; and
   sending an exception to the client application that sent the failed communication.

8. The method of claim 1, further comprising:
   retrying failed communication requests without notifying the client applications.

9. The method of claim 1, further comprising:
   using the queue to provide synchronized communication requests without a race condition in a client application.

10. The method of claim 1, further comprising:
    using the queue to manage communication requests on a first-come, first-served basis.

11. A computer system,
    a processor; and
    a memory coupled to the processor, the memory having program instructions stored thereon that, upon execution by the processor, cause the computer system to:
    receive communication packets from a plurality of client applications;
    add the communication packets with authentication tokens to a queue of communication packets directed to the target service;
    sequentially send at least a subset of the communication packets with valid and unexpired authentication tokens on a first-come, first-served basis to the target service without regard to a source client application;
    determine that a connection is lost to the target service;
    in response to the determination, take a snapshot of the queue by copying pending communication packets and associated authentication tokens from the queue to a local storage in the order the packets were received;
    remove the copied communication packets and associated authentication tokens from the queue;
    determine that the connection is re-established with the target service;
    re-load the copied communication packets and associated authentication tokens from the snapshot to the queue;
    verify a validity of a given authentication token associated with at least one of the re-loaded communication packets in the queue; and
    in response to determining that the given authentication token is valid, send the at least one of the re-loaded communication packets from the queue to the target service.

12. The computer system of claim 11, wherein program instructions, by the processor, further cause the computer system to:
    receive a new communication packet while the network connection is lost; and
    add the new communication packet to the local storage in order with the other communication packets.

13. The computer system of claim 11, wherein program instructions, upon execution by the processor, further cause the computer system to:
    identify when a communication packet transmission to the target service fails; and
    add the failed communication packet to a start of the queue.

14. A computer-readable storage medium device having computer-executable instructions stored thereon that, upon execution by at least one processor of a computer system, cause the computer system to:

receive communication packets from a plurality of client applications;
add the communication packets with authentication tokens to a queue of communication packets directed to the target service;
sequentially send at least a subset of the communication packets with valid and unexpired authentication tokens on a first-come, first-served basis to the target service without regard to a source client application;
determine that a connection is lost to the target service;
in response to the determination, take a snapshot of the queue by copying pending communication packets and associated authentication tokens from the queue to a local storage in the order the packets were received;
remove the copied communication packets and associated authentication tokens from the queue;
determine that the connection is re-established with the target service;
re-load the copied communication packets and associated authentication tokens from the snapshot to the queue;
verify a validity of a given authentication token associated with at least one of the re-loaded communication packets in the queue; and
in response to determining that the given authentication token is valid, send the at least one of the re-loaded communication packets from the queue to the target service.

15. The computer-readable storage medium of claim 14, wherein computer-executable instructions, upon execution by the at least one processor, further cause the computer system to:
identify when a communication packet transmission to the target service fails; and
add the failed communication packet to a start of the queue.

\* \* \* \* \*